US010330510B2

(12) United States Patent
Martin et al.

(10) Patent No.: US 10,330,510 B2
(45) Date of Patent: Jun. 25, 2019

(54) TEMPERATURE SENSING SYSTEM AND FLOW METERING APPARATUS COMPRISED THEREOF

(71) Applicant: Natural Gas Solutions North America, LLC, Houston, TX (US)

(72) Inventors: Jeff Thomas Martin, Spring, TX (US); Andrew Logan Perkins, Houston, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 468 days.

(21) Appl. No.: 14/706,013

(22) Filed: May 7, 2015

(65) Prior Publication Data
US 2016/0327420 A1 Nov. 10, 2016

(51) Int. Cl.
*G01F 1/68* (2006.01)
*G01F 1/684* (2006.01)
*G01F 1/688* (2006.01)
*G01F 15/02* (2006.01)
*G01F 1/696* (2006.01)

(52) U.S. Cl.
CPC .............. *G01F 1/684* (2013.01); *G01F 1/688* (2013.01); *G01F 15/024* (2013.01); *G01F 1/6965* (2013.01)

(58) Field of Classification Search
CPC ........ G01F 1/684; G01F 1/688; G01F 15/024; G01F 1/6965; G01K 3/06; G01D 3/0365
USPC .......................................................... 702/45
See application file for complete search history.

(56) References Cited

U.S. PATENT DOCUMENTS

| | | | |
|---|---|---|---|
| 5,046,369 A | 9/1991 | Boyd et al. | |
| 5,220,830 A | 6/1993 | Bonne | |
| 5,321,638 A | 6/1994 | Witney | |
| 5,869,758 A | 2/1999 | Huiberts | |
| 6,523,427 B1 | 2/2003 | Ferguson | |
| 6,708,571 B1 | 3/2004 | Hopfe et al. | |
| 7,176,701 B2 | 2/2007 | Wachi et al. | |
| 7,263,459 B2 | 8/2007 | Ito et al. | |
| 7,337,661 B2 | 3/2008 | Yamada et al. | |

(Continued)

FOREIGN PATENT DOCUMENTS

CN 201307027 Y 9/2009

*Primary Examiner* — Dzung Tran
(74) *Attorney, Agent, or Firm* — Paul Frank + Collins P.C.

(57) ABSTRACT

A flow metering apparatus comprising a temperature sensing system for use to measure temperature of fluid includes temperature measurement components and temperature sensing components in close proximity to one another and to the flow of fluid. The components can include a temperature measurement member close-coupled to a processor member, each disposed on a circuitized substrate. This configuration exposes a temperature sensor element to the same dynamic temperature conditions as the processor member, thus reducing measurement error that might manifest in response to different temperature gradients proximate the respective components. A storage memory may be used to permit the temperature sensing system to store and/or retain data that relates to calibration as a dynamic system over the entire operating range of the sensor element. The calibration data may then be accessed from the storage memory to improve accuracy and operation of the flow metering apparatus.

13 Claims, 5 Drawing Sheets

(56) References Cited

U.S. PATENT DOCUMENTS

| | | |
|---|---|---|
| 7,437,927 B2 | 10/2008 | Yamada et al. |
| 7,797,997 B2 | 9/2010 | Wu et al. |
| 7,821,321 B2 | 10/2010 | Zimlich |
| 7,826,991 B2 | 11/2010 | Schumacher |
| 8,092,083 B2 | 1/2012 | Venkataraman et al. |
| 8,596,144 B2 | 12/2013 | Rieder |
| 2004/0211253 A1* | 10/2004 | Horie .................. G01F 1/6845 73/204.15 |
| 2006/0272704 A1 | 12/2006 | Fima |
| 2007/0017285 A1* | 1/2007 | Wang .................. G01F 1/6845 73/204.26 |
| 2007/0186684 A1 | 8/2007 | Pham |
| 2009/0158859 A1* | 6/2009 | Huang ................ G01F 1/6845 73/861.351 |
| 2012/0180877 A1* | 7/2012 | Pallais ................ G01M 3/002 137/487.5 |
| 2014/0019025 A1 | 1/2014 | Shinomiya et al. |
| 2014/0090464 A1* | 4/2014 | Sorenson ............ G01F 1/6842 73/273 |
| 2014/0190251 A1 | 7/2014 | Huang et al. |
| 2014/0366614 A1* | 12/2014 | Knittel ................ G01D 21/02 73/114.33 |

\* cited by examiner

TEMPERATURE SENSING SYSTEM AND FLOW METERING APPARATUS COMPRISED THEREOF

BACKGROUND

The subject matter of this disclosure relates generally to temperature measurement on devices that measure flow of fluids.

Gas meters, flow meters, and like flow metering apparatus can be configured to measure a volume of fluid (e.g., gasses and liquids). Such apparatus can incorporate mechanical components that move in response to flow of the fluid. Often, these components form one or more chambers of fixed size. Use of this mechanical structure can account for changes in properties of fluids, which are particularly sensitive to deviations in temperature, pressure, and like operating conditions.

SUMMARY

Some embodiments disclosed herein relate to a temperature sensing system for use with a fluid metering apparatus. In one embodiment, the temperature sensing system can utilize solid-state and/or integrated circuit (IC) components, one or more of which can reside proximate a fluid that flows through the fluid metering apparatus. The components can generate and exchange digitized outputs that relate to a value for temperature of the fluid. In one embodiment, the system can be configured to retain and/or apply calibration data to remediate differences in temperature proximate each of the components.

At a high level, certain embodiments can replace devices that measure temperature in many flow metering apparatuses. These devices often use a resistance temperature detector (also "RTD element" or "RTD"). Examples of an RTD element can include a length of fine coiled wire (e.g., platinum) that winds or wraps around a ceramic or glass core. Changes in local temperature (proximate the RTD element) can alter the resistance of the wire. In most cases, the change in resistance can be very accurately correlated to temperature, often by a measuring circuit that couples with the RTD element and is configured to convert the electrical resistance of the RTD element to a temperature value.

The embodiments can address problems with the construction and dynamic characteristics of RTD-based devices. These problems may arise as a result of structural issues, namely, flux residue on the device that can cause impedance to vary over time and relative to ambient conditions (e.g., temperature, relative humidity, pressure, etc.). Problems can also arise from exposure to thermal gradients. In one example, errors may be introduced during temperature transients because the RTD element cannot respond to changes in temperature fast enough. Aging drift errors relate to the inability of the RTD-based devices to maintain "resistance versus temperature" characteristic over time. Thermal gradients may also cause the RTD-based devices to develop repeatability errors, which relate to the inability of the temperature measuring means to maintain the "resistance versus temperature" characteristic under the same operating conditions after experiencing thermal cycling across a specified temperature range. On the other hand, the RTD-based devices may exhibit hysteresis in which the response of the RTD element results in different temperature values for the same input quantity, depending on whether the input quantity has been increasing or decreasing.

In addition to the problems above, the embodiments herein can address problems found as a result of further study of RTD-based devices. For example, because it contains sensitive electronics and/or components, the measuring circuit in the RTD-based devices often resides a safe distance away from the pipe and/or flow metering apparatus and, thus, remote from the RTD element. In some applications, the measuring circuit and the RTD element can be separated by as much as one meter or more. The study found that this separation between the RTD element and the measuring circuit can provide a path for ingress of external noise error.

The study also found that the separation between the RTD element and the measuring circuit can introduce a disparity in dynamic temperature response between these two components. Calibration of the RTD element fails to address this disparity because it does not characterize the response of the measuring circuit (and the components thereon) at the operating temperature (or across a range of operating temperatures) of the RTD element. Rather, the measuring circuit is often only characterized at a single ambient temperature for a relatively short period of time. Such characterization can make the RTD-based device susceptible to changes in ambient temperature proximate the measuring circuitry and proximate the RTD sensor, in effect, reducing the accuracy of the temperature that is measured once the RTD-based device is in service in the field.

In light of the foregoing, the embodiments herein may incorporate elements and features, one or more of the elements and features being interchangeable and/or combinable in various combinations, examples of which may include:

A flow metering apparatus that can include a main housing forming a chamber, a well member coupled with the main housing and extending into the chamber, and a temperature sensing system configured to measure temperature of fluid in the chamber, the temperature sensing system comprising a first member and a second member coupled with the first member to conduct a digitized output. The first member can be configured to generate the digitized output that relates to a first value for the temperature of a fluid in the chamber. The second member can be configured to receive the digitized output and to generate a calibrated signal in response thereto using calibration data that correlates ambient temperature proximate the first member to ambient temperature proximate the second member.

The flow metering apparatus in which the first member and the second member are disposed in the well member.

The flow metering apparatus in which the first member and the second member each comprises a first substrate and a second substrate, respectively, and in which the first substrate and the second substrate are adjacent one another in the well member.

The flow metering apparatus in which the first member and the second member are formed on the same substrate.

The flow metering apparatus in which the first member can include a temperature sensor element configured to generate an analog signal that corresponds to the temperature of fluid in the chamber and a converter element in communication with the temperature sensor element, the converter element configured to convert the analog signal to the digitized output.

The flow metering apparatus in which the second member can include a storage memory that can be configured to store the calibration data and a processor coupled with the storage memory, and the processor can be configured to use the calibration data to convert the first value to a second value.

The flow metering apparatus in which the temperature sensing system can include a programmable scheduler that is configured to initiate automatic periodic temperature measurements from the first member.

The flow metering apparatus in which the temperature sensing system can include a housing having an elongate body that is configured to fit inside of the well member and in contact with the well member and in which the first member is disposed in the housing.

The flow metering apparatus in which the elongate body has a closed end and an open end and forms an inner cavity, the first member comprises a circuitized substrate with a temperature sensing element disposed thereon, and the circuitized substrate is disposed in the inner cavity proximate the closed end.

The flow metering apparatus in which the second member is disposed in the housing.

A flow metering apparatus that can include a main housing forming a chamber and an elongate body extending into the chamber, the elongate body defining a central cavity and an open end that is configured for access to the central cavity. The flow metering apparatus can also include a first member disposed in the central cavity, the first member comprising a temperature sensor element configured to generate an analog signal and an analog-to-digital converter in communication with the temperature sensor element and configured to convert the analog signal to a digitized output that corresponds with a first value for a measured temperature. The flow metering apparatus can further include a second member coupled to the first member to receive the digitized output, the second member comprising a processor and a storage memory coupled to the processor. The second member can be configured to generate a calibrated signal that corresponds with a second value for the measured temperature in response to the digitized output using calibration data that correlates ambient temperature proximate the first member to ambient temperature proximate the second member.

The flow metering apparatus in which the second member is disposed in the central cavity.

The flow metering apparatus in which the first member and the second member couple with the housing.

The flow metering apparatus in which the first member and the second member reside on a circuitized substrate.

The flow metering apparatus in which the circuitized substrate comprises a first substrate and a second substrate, one each for the first member and the second member.

A kit for measuring temperature of fluid in a chamber that can include a housing insertable into a chamber so as to extend into a flow of fluid, the housing forming a cavity. The kit can also include a temperature measurement member configured to reside in the cavity, the temperature measurement member configured to generate a digitized output that relates to a first value for a temperature in the first cavity of the well member, and a processor member configured to couple with the temperature measurement member, the processor member configured to generate a signal in response to the digitized output, the signal corresponding with a second value for the temperature in the first cavity of the well member. The second value relating to the first value according to calibration data that correlates ambient temperature proximate the temperature measurement member to ambient temperature proximate the processor member.

The kit can further include a well member configured to insert into an opening in a pipe, the well member can be configured to receive the housing therein, and the well member and the housing can be configured to conduct thermal energy from the well member to the housing.

The kit in which the temperature measurement member is coupled to the housing.

The kit in which the processor member is coupled to the housing.

The kit in which the temperature measurement member and the processor member are integrated onto a circuitized substrate and the circuitzed substrate is disposed in the housing.

BRIEF DESCRIPTION OF THE DRAWINGS

Reference is now made briefly to the accompanying drawings, in which.

Figure 1:
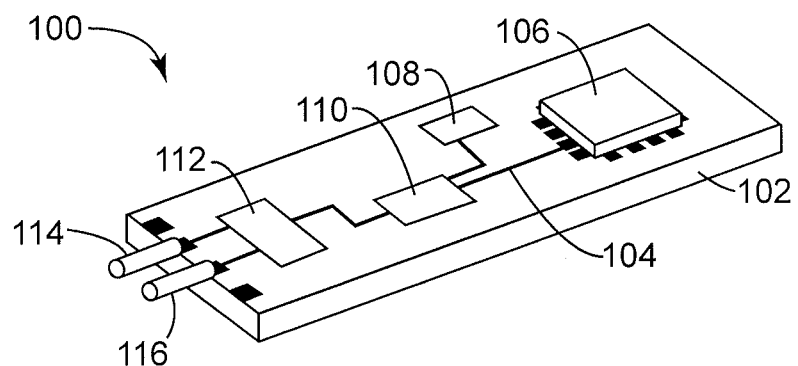
FIG. 1 depicts a schematic diagram of a perspective view of an exemplary embodiment of a temperature measurement member.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and can be modified by, for example, reordering, adding, removing, and/or altering the individual stages.

DETAILED DESCRIPTION

The discussion below describes embodiments of a temperature sensing system configured to overcome many sources of error that can result in inaccurate measures of temperature of fluids. The embodiments can include temperature measuring components and temperature sensing components. These components may reside in close proximity to one another and, in one example, on the same substrate (e.g., silicon, printed circuit board ("PCB"), etc.). Placing the components in close proximity to one another can configure the embodiments so that both components experience the same temperature effects, e.g., temperature fluctuations on the temperature measuring components are the same as on the temperature sensing components. In this way, the embodiments can eliminate errors that might result from distance and/or spacing between these components, although other embodiments are possible and contemplated herein.

The components can leverage solid-state and integrated-circuit (IC) construction to improve accuracy of values for temperature of fluids. This feature can be beneficial at least because the embodiments can be calibrated to characterize and compensate for temperature effects before the system is put in service in the field. For flow meters, gas meters, and related flow metering apparatus, the embodiments can be useful because the volume of fluid (e.g., gas and liquid) in a pipeline may be subject to the effects of pressure as well as temperature according to Charles' and Boyle's laws. When the gas temperature fluctuates, the flow metering apparatus (with integrated temperature sensing system in accordance with the embodiments herein) can compensate for the effects of temperature, correcting the measured volume from a first value that corresponds to a prevailing line condition to a second value that corresponds with a reference condition. This feature can maintain the accuracy of the flow metering apparatus independent of temperature fluctuations at and/or around the components of the temperature sensing system.

FIG. 1 depicts a perspective view of a temperature measurement member 100 (also, "first member 100"). The first member 100 can include a first substrate 102, such as a printed circuit board and/or comprising materials (e.g., silicon and like semi-conducting materials) that are useful to integrate electrical components together. The structure can also include a plurality of electrical components positioned on and/or coupled with conductive surfaces or traces 104 formed on the substrate 102. Examples of the electrical components include a temperature sensor element 106. In one example, the temperature sensor element 106 is a silicon-based integrated circuit that can operate on the principle that, as temperature increases, the voltage across a diode in the temperature sensor element 106 changes at a known rate. In another example, the temperature sensor element 106 can operate based on the principal that voltage change across the base and emitter of a transistor (e.g., $V_{be}$) is proportional to an absolute temperature.

For voltage-based devices, the first member 100 can be configured to amplify and compare the change in voltage to an internal voltage reference 108, such as a bandgap voltage reference. This process can result in an analog signal that is directed (as an input) to an analog-to-digital converter (ADC) 110. The ADC 110 can configure the first member 100 to generate a digitized output. In one example, the output from temperature sensor element 106 can be digitized (to the digitized output) by a sigma-delta ($\Sigma$-$\Delta$) modulator, also known as a charge balance type analog-to-digital converter. This type of converter can utilize time-domain oversampling and a high accuracy comparator to deliver sixteen (16) bits of resolution. Other types of devices for use as the ADC 110 are contemplated within the scope and spirit of this disclosure.

In one example, the first member 100 includes a data communication interface 112 (also "interface 112") to exchange signals over a serial bus protocol. These signals may include the digital output of the first member 100 as well as other outgoing and incoming signals (e.g., control commands from a master processor). The interface 112 may be configured as an Inter-integrated circuit ($I^2C$) communication bus. As shown in FIG. 1, the interface 112 can exchange information via two signal wires (e.g., a serial data line 114 and a serial clock line 116). In another example (not illustrated), the interface 112 can be configured for synchronous serial configuration in the form of a serial peripheral interface (SPI) bus. This configuration of the interface 112 may include four wires to comport with the SPI bus.

Figure 2:
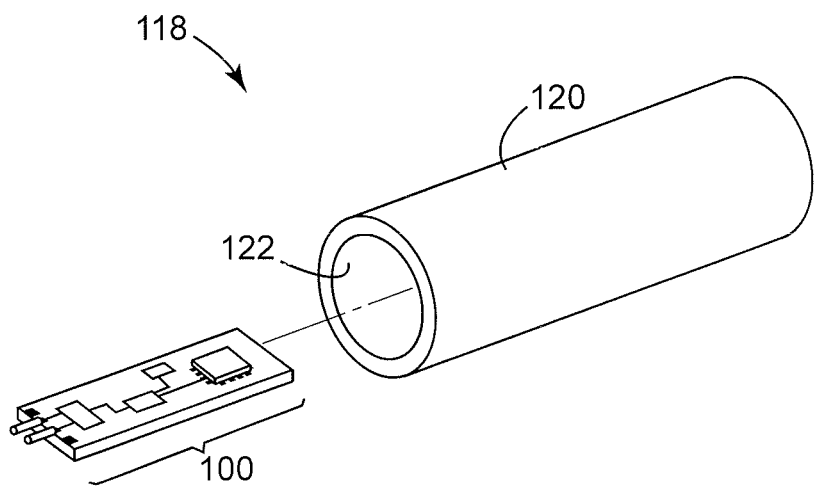
FIG. 2 depicts a schematic diagram of an example of the temperature measurement member in FIG. 1 as part of an exemplary embodiment of a temperature probe assembly shown in exploded form.

FIG. 2 illustrates a perspective view of the first member 100 as part of a temperature probe assembly 118 (also, "probe 118"). In one implementation, the probe 118 can include a housing 120 that can define a central cavity 122 to receive the first member 100 therein. The central cavity 122 may extend completely through the housing 120, or, in other constructions, the central cavity 122 can be open on one end and closed on the other. The probe 118 may include a cap (not shown) that affixes to the housing 120 to cover the open end. This cap may be configured for wires to penetrate, operating both as a strain relief and sealing mechanism to seal and protect the first member 100 inside the central cavity 122.

The housing 120 may have a form factor that is cylindrical in shape, as shown in FIG. 2. However, this disclosure does contemplate that the form factor can assume various shapes (e.g., rectangular, square, triangular, hexagonal, octagonal, etc.) and, in some examples, the form factor of the housing 120 can be selected so as not to interfere with the fluid or gas flow found in piping, conduits, and like applications for the first member 100. In one example, the housing 120 is formed of stainless steel for superior strength and corrosion resistance, but other materials may be found to be acceptable based on appropriate strength, corrosion resistance, and/or other material properties.

The first member 100 may be secured within the central cavity 122 by potting the first substrate 102. Suitable potting materials can include thermally conductive epoxy, silicone, or other suitable material. If the temperature sensor element 106 is not in direct contact with the inner wall of the housing 120, a layer of conductive grease may be applied to fill the gap. In this manner, the temperature sensor element 106 can reach the same temperature as the housing 120, which can improve response time of the temperature sensor element 106 to fluctuations in temperature of the fluid, as contemplated herein.

Figure 3:
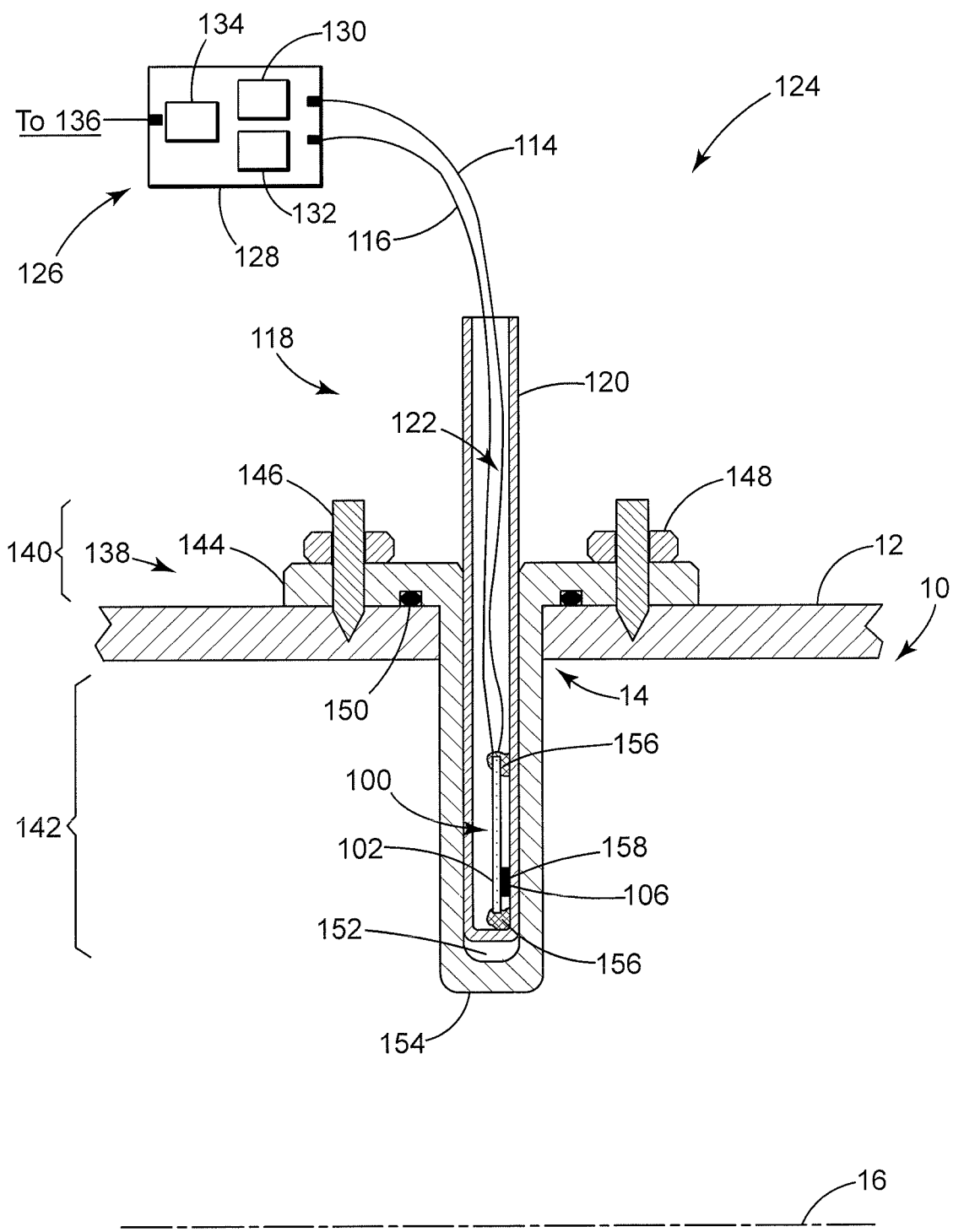
FIG. 3 depicts a schematic diagram of an elevation view of the cross-section of an example of the temperature probe assembly of FIG. 2 as part of an exemplary embodiment of a temperature sensing system shown in a first configuration.

FIG. 3 illustrates, schematically, an elevation view of an exemplary implementation of the first member 100 as part of a temperature sensing system 124 (also, "system 124" or "kit 124"). In this example, the system 124 is configured to measure temperature of a fluid in a chamber 10, shown here in cross-section to provide context to the implementation. The chamber 10 is bounded by a peripheral wall 12, which can embody a pipe (or conduit) as well as structure found in a flow metering apparatus contemplated herein.

In addition to the first member 100, the system 124 can also include a processor member 126 (also, "a second member 126"). Examples of the processor member 126 can include a microcontroller. The processor member 126 can couple with the first member 100 to exchange data and information, often in the form of electrical signals. For example, the serial data line 114 and serial clock line 116 can extend from the interface 112 (FIG. 1) and connect to and/or otherwise terminate at the processor member 126.

Examples of the processor member 126 can leverage solid state and integrated circuit structure. This structure can improve operation of the system 124 to provide accurate and/or reliable temperature values. In one implementation, the structure can include a second substrate 128 on which can be disposed one or more processors (e.g., a first processor 130) and storage memory (e.g., a first storage memory 132). Examples of the first storage memory 132 can include a solid state drive (SSD) based on flash memory, although any relevant solid-state storage devices may be used. In one example, a bus structure 134 may be used to couple various components including the first processor 130 to first storage memory 132. The bus structure 134 can also be configured to couple the processor member 126 with an external host system, identified generally by the numeral 136. The bus structure 134 may represent one or more of any of several types of bus structures including the I²C and SPI structures discussed above. By way of illustration and not limitation, the bus structure 134 may comprise a universal asynchronous receiver/transmitter (UART) controller configured to translate the I²C or SPI protocol data and transmit it to the external host system 136, which may control a flow metering apparatus (e.g., a flow meter, a gas meter, etc.).

At least one benefit of the sensing system 124 is that the first storage memory 132 of the processor member 126 can be configured to store dynamic calibration data that relates to operation of the temperature sensor element 106. In one implementation, the first storage memory 132 may be configured to retain calibration data in a sensor calibration factor table. The calibration data may include characteristic response of the temperature sensor element 106 at numerous temperature points in an expected range of operating temperatures. The processor member 126 can use these characteristic responses (e.g., the calibration data) to correlate ambient temperature proximate the first member 100 and ambient temperature proximate the processor member 126. In one implementation, the first member 100 is configured to generate the digitized output as relates to a first value for the temperature of fluid in a pipeline and/or a flow metering apparatus. The processor member 126 is configured to receive the digitized output and to generate a signal in response thereto. This signal can correspond to a second value for the temperature of fluid in the pipeline and/or the flow metering apparatus that relates to the first value according to calibration data that correlates ambient temperature proximate the first member to ambient temperature proximate the second member.

It may be helpful to employ one or more calibration procedures to characterize the temperature sensor element 106 (prior to installation in chamber 10). These calibration procedures may obtain calibration values at a plurality of temperature values (e.g., three, four, or five temperature values) over the full operating range of the temperature sensor element 106. The calibration values could be stored as the calibration data in the sensor calibration factor table on storage memory 132 and later accessed by the processor member 126. In another example, calibration and/or characterization over the complete operating range can be performed for the temperature sensor element 106 with one or more of the members 100, 126 installed in position in the chamber 10. This feature can be an improvement because other devices may require extensive calibration at the factory (prior to incorporation into any device), which can drive up costs to obtain and implement such hardware.

In FIG. 3, the system 124 is shown in a first configuration with the members 100, 126 in a first spaced relation that locates these components remote from one another. When used in a flow metering apparatus (e.g., a gas meter), the first spaced relation may be beneficial to locate the processor member 126 for access to upload and download data (e.g., calibration data) and/or related executable instructions in the form of computer programs (e.g., firmware, software, etc.). However, the system 124, as a whole, can offer a more robust design because the system 124 can be constructed to include calibration data and to utilize the calibration data to dynamically-correct for potential discrepancies in local temperature at each of the first member 100 and the processor member 126.

As also shown in FIG. 3, a well member 138 may be used to receive and house the temperature probe assembly 118 (and its constituent components). The well member 138 can be configured to insert into an opening 14 that penetrates the peripheral wall 12 of the chamber 10. The well member 138 can have a body with a first or outer portion 140 and a second or inner portion 142, one each that are located outside and inside of the chamber 10, respectively. Broadly, the body may be fabricated from any suitable thermally conductive material that will withstand the dynamic forces caused by flow of fluid in the chamber 10. In one example, the body is fabricated from stainless steel. The portions 140, 142 of the body may be formed monolithically, as if machined from a single block (or billet) of material; however, in one construction, the first portion 140 and the second portion 142 may embody one or more pieces that secure together using fasteners and/or suitable manufacturing techniques (e.g., welding).

The outer portion 140 of the body may include a flange 144 that may be adapted to fit the shape and/or contour of the outer surface(s) of the peripheral wall 12. The flange 144 may be circular or annular, although such configuration may give way to other shapes to fit a specific application for the system 124. The flange 144 can be secured to the chamber 10 by one or more fasteners, e.g., as bolts 146 and nuts 148. The fasteners 146, 148 can be configured to provide sufficient clamping force to compress a compliant seal element 150 (e.g., an O-ring, an elastomer, etc.). The compliant seal element 150 may circumscribe the opening 14 and, in turn, seal the inside or internal area of the chamber 10 from the ambient environment. In another example, the flange 144 may be secured to the pipe 10 by welding or like manufacturing techniques. These techniques may obviate the need for the compliant seal element 150.

The inner portion 142 of the body may be elongated or tube-shaped and extend radially from the peripheral wall 12 toward a centerline 16 of the chamber 10. The elongated body can have an inner cavity 152 that terminates at a closed end 154. The inner cavity 152 can be configured to receive the probe 118. The elongated body can be beneficial to position at least part of the probe 118 proximate fluid that flows through the chamber 10. In one implementation, the housing 120 of the probe 118 can be adapted to substantially conform to walls of the inner cavity 152. Such adaptations may effectuate thermal transfer from fluid in the chamber 10 to the temperature sensing element 106 because of contact between one or more surfaces of the housing 120 and one or more surfaces of the well member 136. Surface-to-surface contact can promote conduction of thermal energy from surfaces of the well member 138 in contact with fluid to the central cavity 122 of the housing 120.

In one implementation, the first member 100 may be disposed within the central cavity 122, often with the temperature sensor element 106 proximate and/or in contact with the inner wall of the housing 120. The position of the temperature sensor element 106 can promote thermal transfer for accurate measurement of temperature. To secure the first member 100 in position, the first substrate 102 may couple with the inner wall of the housing 120; in one example, a thermally conductive compound 156 such as epoxy, silicone, or other suitable materials may be used on one or more surfaces of the first substrate 102 and the wall member 138 to promote adhesion of these components. A layer of conductive grease 158 may be used to fill any gaps, particularly if the temperature sensor element 106 is not in direct contact with the inner wall of the housing 120. The grease 158 can also promote thermal transfer between the temperature sensor element 106 and the housing 120. In this manner, the temperature sensor element 106 can reach the same temperature as the housing 120 to improve the response time of the temperature sensor element 106.

Figure 4:
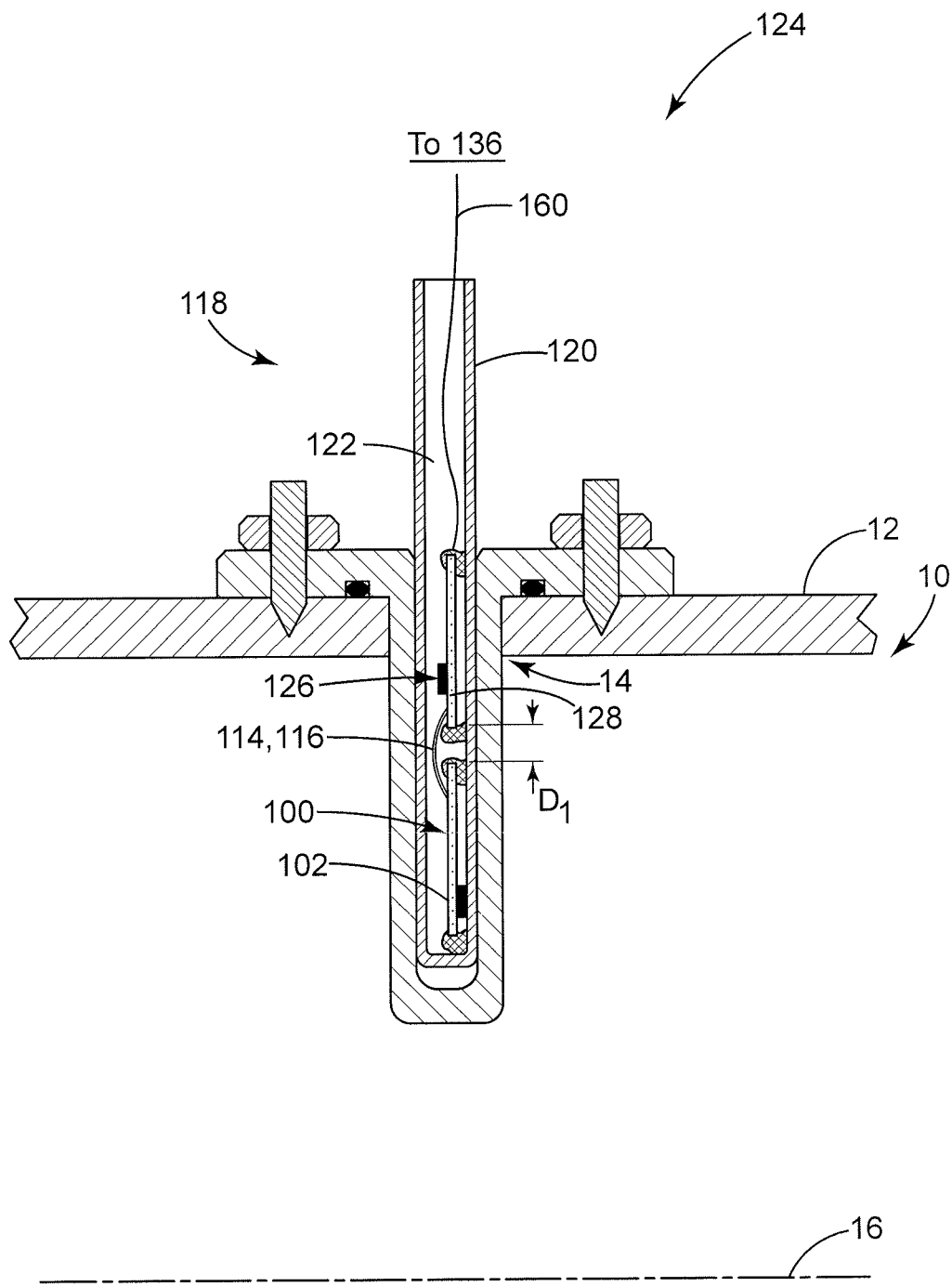
FIG. 4 depicts a schematic diagram of an elevation view of the cross-section of an example of the temperature probe assembly of FIG. 2 as part of an exemplary embodiment of a temperature sensing system shown in a second configuration.

FIG. 4 illustrates a second configuration for an example of the temperature sensing system 124. In this second configuration, the members 100, 126 are in a second spaced relation that locates these components in close proximity (or closely-coupled) to one another. The close proximity of these components can further improve accuracy, e.g., by alleviating inherent errors from insulation resistance and other noise that might permeate the system between the first member 100 and the processor member 126. As shown in FIG. 4, the second spaced relation may be defined by a dimension $D_1$ as measured, in one example, between adjacent, peripheral edges of the substrates 102, 128. In one example, the dimension $D_1$ is approximately 2 cm or less. In other examples, the first substrate 102 is adjacent the second substrate 128 and, in some cases, the substrates 102, 128 abut and/or contact each other. This disclosure also contemplates that, in lieu of substrates 102, 128, the sensing system 124 may be configured for components of the first member 100 and the processor member 126 to reside on a single substrate (e.g., first substrate 102).

The second configuration can arrange the system 124 with both of the members 100, 126 disposed in the housing 120. This construction can simplify manufacturing and packaging of the probe assembly 118 as a single, unitary device. In one implementation, the serial data line 114 and serial clock line 116 may comprise jumpers that electrically connect the first substrate 102 and the second substrate 128. The system 124 may also include one or more conductive members (e.g., a first conductive member 160) that can extend through an open end of the housing 120. Examples of the first conductive member 160 can include conductive wiring, cables (e.g., coaxial cable), bundles of wires, flexible circuitry, and like conductive members. In use, the first conductive member 160 can couple the system 124 with the external host system 136 to exchange data and information (e.g., temperature data). The first conductive member 160 may be potted inside of the housing 120 to provide a more robust design. As noted above, a cap (not shown) may be inserted over the open end of the housing 120 to seal the members 100, 126 in the central cavity 122.

Figure 5:
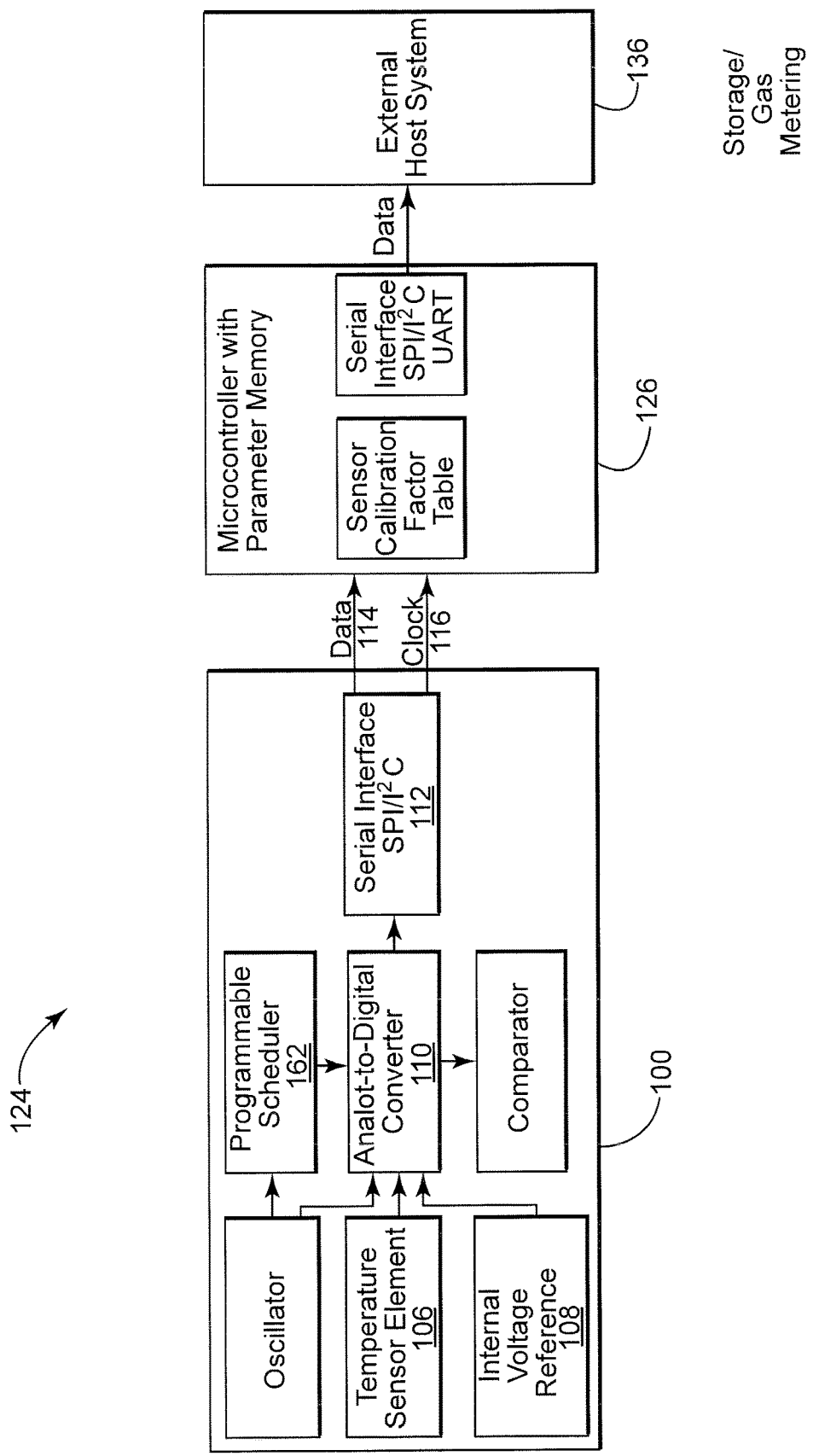
FIG. 5 depicts a functional block diagram of an example of the temperature sensing system of FIGS. 3 and 4.

FIG. 5 depicts a functional block diagram of an example of the sensing system 124. As noted herein, the sensing system 124 can offer a number of benefits, at least one of which being that the processor member 126 can be programmed to perform specific tasks related to uptake and gathering of temperature data received from the first member 100. For example, measurements may be initiated externally by signals from the processor member 126. The system 124 can also be set up for automatic periodic measurements using a programmable scheduler 162, shown here on the first member 100, but compatible for integration on the processor member 126, as desired. The programmable scheduler 162 can include or has access to internal registers to compare the periodic temperature measurements to upper and lower window thresholds. This automatic mode of operation can offer significant system power savings compared to systems using a host-initiated measurement. The system 124 can also be configured to interrupt operation of the external host system 136. For example, if the system 124 senses a temperature that deviates (e.g., over, under, etc.) a pre-determined threshold temperature and/or senses an abrupt change in temperature, the system 124 can alert the host system 136. This feature can allow the external host system 136 to act on a significant change of internal temperature. In the field, signals from the system 124 may stimulate actions to generate an output in the form of an alert to service personnel, e.g., to address certain operation issues at a flow metering apparatus.

Figure 6:
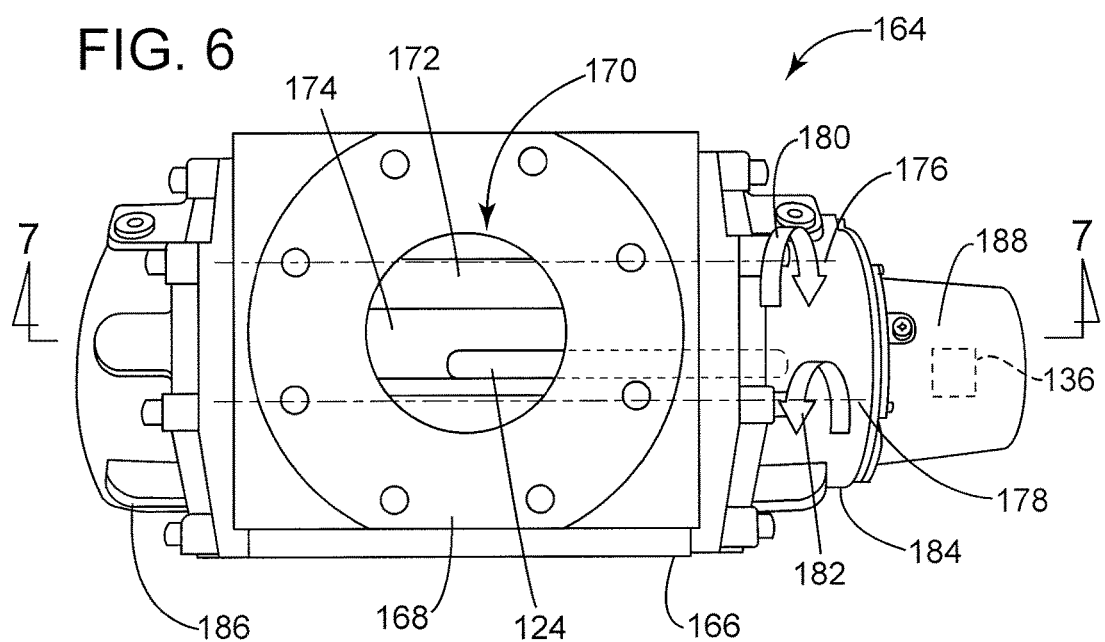
FIG. 6 depicts a side view an example of the system of FIGS. 3, 4, and 5 as part of an exemplary embodiment of a fluid metering apparatus.

FIG. 6 illustrates an example of the sensing system 124 in position on a flow metering apparatus 164. Examples of the flow metering apparatus 164 can include a gas meter and/or a flow meter. For purposes of example only, the flow metering apparatus 164, as illustrated, can be a rotary positive displacement gas meter that is configured for custody transfer measurement in a pipeline. The flow metering apparatus 164 can include a main housing 166 having an inlet flange 168 on one side (also "inlet side") and a discharge flange (hidden from view) on an opposing side (also "discharge side") of the main housing 166. The flow metering apparatus 164 may be configured for in-line installation on the pipeline (not specifically represented), wherein the flow metering apparatus 164 is integrated directly as a section of the pipeline. In one example, the inlet flange 168 may couple with a first or inlet portion of the pipeline and the discharge flange may coupled with a second or exit portion of the pipeline.

The main housing 166 can define an inner metering chamber 170 (e.g., chamber 10 of FIGS. 3 and 4) to encase one or more pumping elements. In the illustrated example, the pumping elements can embody two lobe-shaped impellers (e.g., a first impeller 172 and a second impeller 174). The impellers 172, 174 can contra-rotate about separate longitudinal axes 176 and 178, respectively, as indicated by the arrows enumerated 180 and 182. The impellers 172, 174 are typically coupled and maintained in precise alignment (or synchronized) by way of a timing gear (not shown). During rotation, the cavities formed between the lobe-shaped impellers 172, 174 and the main housing 166 fill and discharge with a specific, known volume of gas. Thus, the rotation of the impellers 172, 174 is proportional to the gas flow, and the rotation may be transmitted via an adjusting gear (not shown) or like mechanism to a counter member (not shown) that records the gas volume that has passed through the flow metering apparatus 164.

With continued reference to FIG. 6, the flow metering apparatus 164 can further include one or more main housing covers (e.g., a first housing cover 184 and a second housing cover 186). The covers 184, 186 can be configured to seal on either end of the main housing 166. The main housing covers 184, 186 may enclose or otherwise include one or more bearing packages, a bearing lubrication reservoir and slinger assembly, and the timing gear needed to keep the impellers 172, 174 in correct relative position. The flow metering apparatus 164 can further include a counter housing 188 that encases the hardware and electronics (of the counter member) to count the impeller rotations and calculate the concomitant volumetric flow. In one example, the counter housing 188 may incorporate the external host system 136, details which are described in connection with FIGS. 3 and 4 above.

Figure 7:
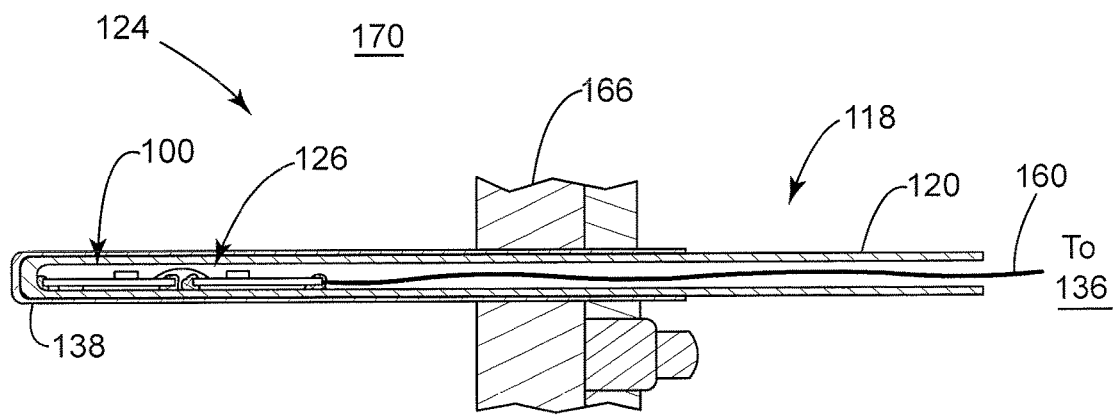
FIG. 7 depicts a schematic diagram of an elevation view of the cross section of the fluid metering apparatus of FIG. 6.

FIG. 7 illustrates, schematically, an elevation view of a cross-section of the flow metering apparatus 164 taken at line 7-7 of FIG. 6. The system 124 is shown in the second configuration with the members 100, 126 disposed in the housing 120 and closely-coupled to one another. The well member 138 can protrude into the inner metering chamber 170 of the main housing 166. The housing 120 can insert into the well member 138, effectively positioning both the members 100, 126 proximate, and possibly in, the flow of fluid that traverses the flow metering apparatus 164 in the metering chamber 170 from the inlet side to the discharge side. The well member 138 may be sealingly coupled to the main housing 166 to prevent leakage. In one example, the well member 138 may integrate with the main housing 166 to form a single, monolithic unit, whether by way of machining the well member 138 as part of the main housing 166 or by affixing the well member 138 in position on the main housing 166 using techniques contemplated herein. The probe 118 can be configured to insert into and remove from the well member 138 without disturbing the seal formed between the first housing cover 184 (FIG. 6) and the metering chamber 170 of the main housing 166.

As noted above, the second configuration can maintain accuracy of the flow metering apparatus 164. The first member 100 can be configured to generate a digital output that encodes and/or comprises data that relates to the temperature of the fluid inside the flow metering chamber 170. The digital output may serve as an input to the processor member 126. The second spaced relation of the members 100, 126 is beneficial to maintain performance and accuracy of the flow metering apparatus 164. The close proximity of the members 100, 126, for example, permits system characterization (e.g., system response) and compensation over the entire operating range of the fluid metering apparatus 164, and minimizes or eliminates potential calibration errors introduced by the processor member 126 being located in a different temperature environment than the first member 100.

Embodiments of the system 124 (and one or more of the first member 100 and the processor member 126) can be used with a variety of flow metering apparatus, including but not limited to diaphragm-type meters, turbine meters, orifice meters, ultrasonic flow meters, and Coriolis meters. This disclosure contemplates that embodiments of the system 124 disclosed herein may have application in almost any device and/or apparatus that requires temperature compensation, including liquid flow meters. Exemplary flow meters include but are not limited to mechanical flow meters, such as piston meters or rotary piston meters, gear meters, variable area meters, turbine flow meters, Woltmann meters, single jet meters, paddle wheel meter/multiple jet meters, Pelton wheels, and current meters; pressure-based meters, such as venturi meters, orifice plates, Dall tubes, pitot-static tubes, multi-hole pressure probes, and cone meters; optical flow meters; open-channel flow measurements, such as area/velocity, and acoustic Doppler velocimetry; thermal mass flow meters, such as a mass airflow sensor; vortex flow meters; electromagnetic, ultrasonic, and Coriolis flow meters; and laser Doppler flow measurement. However, it is noted that the system 124 can be used in applications other than flow metering including, for example, any application where a temperature measurement may be needed (e.g., ovens, refrigerators, etc.).

Furthermore, the term "flow metering apparatus" is not intended to be limited to flow meters. It is envisaged that, in addition to gas flow meters, "flow metering apparatus" means any flow device that reports the temperature of the gas. Non-limiting examples include devices that correct flow for gas or fluid meters, valves, and valve actuators.

The substrates 102, 128 can embody substrates (also, "circuitzed substrates") having at least one dielectric layer and at least one external metallurgical electrically conductive layer. Examples include structures made of dielectric materials such as fiberglass-reinforced epoxy resins (some referred to as "FR-4" dielectric materials in the art), polytetrafluoroethylene (Teflon®), polyimides, polyamides, cyanate resins, photo-imageable materials, and other like materials wherein the conductive layers are each a metal layer (e.g., power, signal and/or ground) comprised of suitable metallurgical materials such as copper, but may include or comprise additional metals (e.g., nickel, aluminum, etc.) or alloys thereof. If the dielectric materials for the structure are of a photo-imageable material, it is photo-imaged or photo-patterned, and developed to reveal the desired circuit pattern, including the desired opening(s) as defined herein, if required. The dielectric material may be curtain-coated or screen-applied, or it may be applied as dry film. Final cure of the photo-imageable material provides a toughened base of dielectric on which the desired electrical circuitry is formed. Examples of circuitized substrates include printed circuit boards and chip carriers. However, embodiments of the present disclosure are also applicable to so-called "flex" circuits, which use dielectric materials such as polyimide, and to those substrates which use silicon, ceramic, or other non-polymer type dielectric layers, such as multi-layered ceramic modules.

Printed circuit boards, chip carriers, and like circuitized substrates typically include at least one planar surface (or two opposing planar surfaces) on which electronic components such as semiconductor chips, resistors, capacitors, modules, etc. may be mounted. One or more chip carriers may be mounted to the printed circuit board, each chip carrier including one or more chips mounted to a chip carrier substrate, utilizing wire-bond or solder reflow technologies, for example. Circuit paths for the electronic components are typically provided by forming conductive lines, or traces, on the planar surface of the circuit board. The traces may extend from pads surrounding the electronic components to thru-holes in the circuit board (e.g., vias), or may extend to another component mounted on the board. The traces may extend to conductive pads at the edge of the circuit board, to which connection lead wires may be soldered or otherwise connected.

In view of the foregoing, by being a self-contained system on the same or closely-coupled substrate, the embodiments herein are much less susceptible to effects of temperature variance. These embodiments can also compensate for any effects with the dynamic and steady state temperature response more accurately determined over any ambient temperature in which the flow component is normally operating. Also, the cost of manufacturing is reduced due to a lower required bill-of-material component count and, as a result of using fewer external components, the reliability of the system and device is greatly improved.

As used herein, an element or function recited in the singular and proceeded with the word "a" or "an" should be understood as not excluding plural said elements or functions, unless such exclusion is explicitly recited. References to "one embodiment" should not be interpreted as excluding the existence of additional embodiments that also incorporate the recited features. Furthermore, while the term chamber is used herein, this term is to be construed broadly and is not limited to an enclosed space. For example, a "chamber" includes a space within a length of pipe, conduit, or like member.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gas meter, comprising:
a main housing forming a chamber;
impellers disposed in the chamber;
a first elongate tube with a closed end, the first elongate tube coupled with the main housing and extending into the chamber proximate the impellers so as to locate the closed end in the chamber;
a counter housing coupled at one end of the main housing;
a host system disposed in the counter housing and configured to calculate volumetric flow; and
a temperature sensing system coupled with the host system and disposed entirely in the first elongate tube, the temperature sensing system comprising a first part and a second part that couples with the first part to conduct a digitized output therebetween,
wherein,
the first part comprises a silicon-based integrated circuit having a diode coupled with an analog-to-digital converter that generates the digitized output as a first value for temperature of a fluid in the chamber in response to voltage across the diode,
the second part comprises a microcontroller that receives the digitized output, the microcontroller comprising a processor and memory, the memory storing calibration data and executable instructions that the processor can upload, the executable instructions for generating a calibrated signal in response to the digitized output using the calibration data,
wherein the silicon-based integrated circuit and the microcontroller reside in the first elongate tube in position so that both are exposed inside the chamber and proximate the impellers to ambient temperature that is the same,
wherein the calibrated signal reflects a second value for temperature for the fluid in the chamber, which corresponds to the first value calibrated to account for calibration data that correlates ambient temperature at the first part to ambient temperature the second part,
wherein the host system receives the calibrated signal and applies the second value for temperature for the fluid in the chamber to the volumetric flow, and
wherein the temperature sensing system interrupts operation of the host system to control said gas meter in response to temperature in excess of a pre-determined threshold.

2. The gas meter of claim 1, wherein the first part and the second part are disposed in the first elongate tube to co-locate in the chamber.

3. The gas meter of claim 1, wherein the first part and the second part each comprises a first substrate and a second substrate, respectively, and wherein the first substrate and the second substrate are adjacent one another in the first elongate tube.

4. The gas meter of claim 1, wherein the first part and the second part are formed on the same substrate.

5. The gas meter of claim 1, wherein the first part comprises:
a converter element in communication with the silicon-based integrated circuit, the converter element configured to convert an analog signal from the silicon-based integrated circuit to the digitized output.

6. The gas meter of claim 1, wherein the microcontroller comprises:
a storage memory configured to store the calibration data and the executable instructions; and
a processor coupled with the storage memory, the processor configured to use the calibration data to convert the first value to a second value.

7. The gas meter of claim 1, wherein the temperature sensing system comprises:
a second elongate tube that receives the first elongate tube and is in thermal contact with the first elongate tube, wherein the first part is disposed in both the first elongate tube and the second elongate tube.

8. The gas meter of claim 7, wherein the second part is disposed in both the first elongate tube and the second elongate tube.

9. A gas meter, comprising:
a main housing forming a chamber;
impellers disposed in the chamber;
a counter housing coupled at one end of the main housing;
a host system disposed in the counter housing and configured to calculate volumetric flow;
a first elongate body extending into the chamber proximate the impellers, the first elongate body defining a central cavity, a closed end, and an open end for access to the central cavity;
a silicon-based integrated circuit responsive to temperature disposed in the first elongate body so as to reside in the chamber, the silicon-based integrated circuit comprising,
a diode; and
an analog-to-digital converter in communication with the diode to generate a digitized output that corresponds with a first value for a measured temperature in the chamber in response to voltage across the diode; and
a microcontroller coupled to the analog-to-digital converter and disposed in the elongate body proximate the silicon-based integrated circuit, the microcontroller comprising a processor and a storage memory coupled to the processor and storing calibration data and executable instructions that the processor can upload, the executable instructions for,
generating a calibrated signal that corresponds with a second value for the measured temperature in response to the digitized output using the calibration data, the calibrated signal correlating ambient temperature proximate the silicon-based integrated circuit to ambient temperature proximate the microcontroller,
wherein the diode, the analog-to-digital converter, and the microcontroller reside in the elongate body in position so that all are exposed inside the chamber and proximate the impellers to ambient temperature that is the same,
wherein the host system receives the calibrated signal and applies the second value for temperature for the fluid in the chamber to the volumetric flow, and
wherein the temperature sensing system interrupts operation of the host system to control said gas meter in response to temperature in excess of a pre-determined threshold.

10. The gas meter of claim 9, wherein the microcontroller is disposed in the central cavity.

11. The gas meter of claim 9, wherein the silicon-based integrated circuit and the microcontroller couple with the first elongate body.

12. The gas meter of claim 9, wherein the silicon-based integrated circuit and the microcontroller reside on a circuitized substrate.

13. The gas meter of claim 12, wherein the circuitized substrate comprises a first substrate and a second substrate, one each for the silicon-based integrated circuit and the microcontroller.

\* \* \* \* \*